Patented Aug. 9, 1949

2,478,853

UNITED STATES PATENT OFFICE 2,478,853

METALLATION OF MALONIC ESTERS

Vernon H. Wallingford, Ferguson, and August H. Homeyer, Webster Groves, Mo., assignors to Mallinckrodt Chemical Works, St. Louis, Mo., a corporation of Missouri No Drawing. Application October 29, 1945, Serial No. 625,449

6 Claims. (Cl. 260—475)

This invention relates to the metallation of organic compounds, and with regard to certain more specific features to the replacement of active carbon-bonded hydrogen atoms of malonic esters with metals of the class of the alkali metals and magnesium.

Among the several objects of the invention may be noted the provision of a general process for bringing about a metallation of the type indicated which is characterized in its high yields, its inexpensive and readily procurable reaction materials, and the facility with which it may be carried out. Other objects will be in part obvious and in part pointed out hereinafter.

The invention accordingly comprises the steps and sequence of steps, and features of synthesis, analysis, or metathesis, which will be exemplified in the processes hereinafter described, and the scope of the application of which will be indicated in the following claims.

Metal organic compounds of the alkali metals and magnesium are exceedingly useful intermediates for the preparation of a wide variety of organic compounds. Many processes have been devised for the preparation of such compounds, but these prior processes have usually offered one or another disadvantage, such as low yields, expensive or unavailable reaction materials, difficult reaction conditions, and the like. The present invention provides a metallation process which, so far as we can determine, is free of all such disadvantages and which consequently is a highly advantageous procedure to use to achieve the desired results.

It is difficult to define with accuracy the broad class of materials to which the process of the present invention applies. In general, it appears that the process can be satisfactorily used in all instances where metallation of the type indicated is wanted. Most of such instances seem to comprehend the replacement of an active carbon-bonded hydrogen on the organic compound with the metal, and the invention will be so described, although it is not intended thereby to so limit the scope of the invention.

From the practical standpoint, metallation of the type herein concerned is usually the formation of the sodium (sodio-) compound. But it will likewise be clearly understood that metallation with the other alkali metals, that is, with lithium, potassium, rubidium, cesium or with magnesium, is not only feasible but also expeditious according to the present invention.

Broadly speaking the process of the present invention comprises treating malonic esters to be metallated with a metal alcoholate, preferably alcohol-free, in a reaction medium comprising a dialkyl carbonate. This may be represented by the following equation:

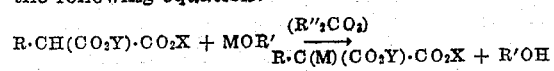

$$R \cdot CH(CO_2Y) \cdot CO_2X + MOR' \xrightarrow{(R''_2CO_3)} R \cdot C(M)(CO_2Y) \cdot CO_2X + R'OH$$

where R is hydrogen or an aromatic or saturated aliphatic hydrocarbon radical, M is lithium, sodium, potassium, rubidium, cesium or magnesium, R' is the radical of the alcoholate, and R'', X and Y are alkyls.

Whether or not the dialkyl carbonate actually enters into the reaction has not yet been definitely established. Its resence appears to be an important factor.

The reaction may be forced to substantial completion by heating, as it progresses, to distill off the product alcohol (R'OH in the above equation). In case the original metal alcoholate contains alcohol, such alcohol is likewise removed by this distillation procedure. This procedure, while somewhat optional, is highly advantageous in its improvement of the yield of metallo-compound obtained.

The following examples illustrate the present invention. They are exemplary only.

EXAMPLE 1

Diethyl malonate

Sodium ethylate, substantially free of alcohol, was prepared by dissolving sodium metal (6.04 g.) in anhydrous ethyl alcohol (150 ml.) in a three-necked flashk fitted with a reflux condenser. When the sodium had dissolved the condenser was arranged for distillation and the excess alcohol was distilled off and the residue was heated at reduced pressure until the sodium ethylate was substantially free of alcohol. After cooling, the solid cake of sodium ethylate was broken up. Diethyl carbonate (150 ml.) and diethyl malonate (42 g.) were then added and the mixture was stirred until all of the solid sodium ethylate had gone into solution. The flask was then connected to a small packed column arranged for distillation under reduced pressure. Completion of the metallation reaction was brought about by heating the reactants in the flask at about 90–100° C. and the alcohol from the reaction of the sodium ethylate and diethyl malonate, as well as any small amount left in the sodium ethylate, was removed as distillate at the head of the column at 41–43° C. under 150 mm. pressure.

To prove the presence of a high yield of metallated diethyl malonate, the contents of the flask were alkylated by refluxing with an excess of isopropyl bromide until the reactants were no longer alkaline to phenolphthalein test paper. The reaction mixture was worked up by adding water, acidifying, extracting with ether, drying the extract, and distilling off the ether. Distillation of the residue gave a yield of 42.6 g. (80.3%) of diethyl isopropylmalonate.

Example 2

Diethyl malonate

Sodium ethylate, substantially free of ethyl alcohol, was prepared as in Example 1 from sodium metal (11.5 g.) and anhydrous ethyl alcohol (200 ml.). Diethyl carbonate (300 ml.) and diethyl malonate (42 g.) were added and the mixture stirred until all of the sodium ethylate had dissolved. After connecting the reaction flask to a small packed column the metallation reaction was brought to completion by heating the reactants at 90–100° C. until no more alcohol came off as distillate at the head of the column. The alcohol was collected for the most part at 41–43° C. under 150 mm. pressure. The total amount of alcohol collected was essentially the theoretical amount which would be liberated by the action of two moles of sodium ethylate on one mole of diethyl malonate. This indicated that the dimetallo derivative of diethyl malonate had been formed by this metallation reaction.

The presence of a high yield of the dimetallated derivative of diethyl malonate was shown by alkylating with an excess of ethyl bromide. A good yield of diethyl diethylmalonate was obtained.

Example 3

Diethyl ethylmalonate

Sodium ethylate, substantially free of ethyl alcohol, was prepared as in Example 1 from sodium metal (12.1 g.) and anhydrous ethyl alcohol (225 ml.). Diethyl carbonate (300 ml.) and diethyl ethylmalonate (94 g.) were added and the mixture stirred until all of the sodium ethylate had dissolved. After connecting the reaction flask to a small packed column, the metallation reaction was brought to completion by heating the reactants at 90–100° C. until no more alcohol came off as distillate at the head of the column under 150 mm. pressure.

The presence of a high yield of metallated diethyl ethylmalonate was shown by alkylating with an excess of isoamyl bromide. A yield of 98 g. (76% of theoretical) of diethyl isoamylethylmalonate was obtained.

Example 4

Diethyl sec.-butylmalonate

Sodium ethylate, substantially free of ethyl alcohol, was prepared as in Example 1 from 6.04 g. of clean sodium metal and 100 ml. of anhydrous ethyl alcohol. Diethyl sec.-butylmalonate (54 g.) and diethyl carbonate (100 ml.) were added and the mixture stirred until all of the sodium ethylate had dissolved. After connecting the reaction flask to a small packed column, the metallation reaction was brought to completion by heating the reactants at 90–100° C. until no more alcohol came off as distillate at the head of the column under 150 mm. pressure.

The presence of a high yield of metallated diethyl sec.-butylmalonate was shown by alkylating with an excess of ethyl bromide. A yield of 57.8 g. (94.8%) of diethyl sec.-butylethylmalonate was obtained.

Previously reported attempts by other methods to prepare the metallated derivative of diethyl sec.-butylmalonate and react it with ethyl bromide have given extremely small yields of the desired derivative.

Example 5

Dibutyl cetylmalonate

Potassium n-butylate substantially free of n-butyl alcohol was prepared from potassium (7 g.) and n-butyl alcohol (70 ml.). Di-n-butyl carbonate (175 g.) and di-n-butyl cetylmalonate (75 g.) were added and the mixture was stirred and warmed until the potassium butylate was dissolved, n-butyl alcohol being simultaneously fractionated out of the refluxing reaction under a pressure of 50 mm. Metallation was judged to be complete when heating the reaction at 90–100° C. under 50 mm. pressure produced no further n-butyl alcohol at the head of the fractionating column.

The presence of a high yield of metallated dibutyl cetylmalonate was shown by benzylating the reaction mixture with benzyl chloride. A yield of 60 g. (67%) of di-n-butyl benzylcetylmalonate was obtained, B. P. 238–240° C. at 1 mm., $n_D^{27}$ 1.4712, and F. P. −7° to −11° C.

The identity of the product was established by converting it successively to the malonic acid, cetylbenzylacetic acid, the acid chloride, and the 2,4,6 - tribromoanilide. Cetylbenzylacet - (2,4,6-tribromoanilide) melted at 85–87° C. Analysis: Calculated for $C_{31}H_{44}OBr_3$: Br 35.0%; found: Br 35.1%.

Example 6

Diethyl p-methylphenylmalonate

Sodium ethylate, substantially free of alcohol, was prepared as in Example 1 from sodium metal (2.62 g.) and anhydrous ethyl alcohol (75 ml.). Diethyl carbonate (100 ml.) and diethyl p-methylphenylmalonate (28.5 g.) were added and the resulting mixture stirred until all of the sodium ethylate dissolved. After connecting the reaction flask to a small packed column, the metallation reaction was brought to completion by heating the reactants at 90–100° C. until no more alcohol was obtained as distillate at the head of the column under 150 mm. pressure.

The presence of a high yield of metallated diethyl p-methylphenylmalonate was shown by alkylating with an excess of ethyl bromide. The reaction mixture was worked up in the usual manner and from it was isolated, in good yield, diethyl ethyl-p-methylphenylmalonate having a boiling point of 116–117° C. at about 0.5 mm. and an index of refraction of about $n_D^{25.6}$ 1.4912.

Example 7

Diethyl phenylmalonate

Sodium ethylate, substantially free of ethyl alcohol, was prepared as in Example 1 from 12.1 g. of sodium metal and 225 ml. of anhydrous ethyl alcohol. Diethyl carbonate (350 ml.) and diethyl phenylmalonate (118 g.) were added and the mixture stirred until all of the sodium ethylate dissolved. After connecting the reaction flask to a small packed column, the metallation reaction was brought to completion by heating the reactants at 90–100° C. until no more alcohol was obtained as distillate at the head of the column under 150 mm. pressure.

The presence of a high yield of metallated diethyl phenylmalonate was shown by alkylating with an excess of ethyl bromide. A yield of 104.3 g. (79%) of diethyl ethylphenylmalonate, boiling at 135-146° C. under 4.5-6 mm. pressure, was obtained.

EXAMPLE 8

Diethyl phenylmalonate

To diethyl carbonate (450 ml.) was added solid anhydrous sodium ethylate (43 g.) and then diethyl phenylmalonate (177 g.) and the mixture was stirred until all of the sodium ethylate dissolved. After connecting the reaction flask to a small packed column, the metallation reaction was brought to completion by heating the reactants at 90-100° C. until no more alcohol was obtained as distillate at the head of the column under 250 mm. pressure.

The presence of a high yield of metallated diethyl phenylmalonate was shown by alkylating with an excess of ethyl bromide. A yield of 179.3 g. of the mixed methyl and ethyl esters of ethylphenylmalonate, boiling at 125-147° C. under 9-4 mm. pressure was obtained.

EXAMPLE 9

Diethyl malonate

Magnesium turnings (6.08 g.), catalyzed with chloroform (5 ml.), were dissolved in anhydrous ethyl alcohol (250 ml.) in a three-necked flask fitted with a reflux condenser and a motor stirrer. As the magnesium dissolved during the refluxing of the mixture, magnesium ethylate precipitated as a white flocculent solid. On complete solution of the magnesium, diethyl malonate (40 g.) and diethyl carbonate (300 ml.) were added and the resulting mixture was stirred until all of the magnesium ethylate had gone into solution. The reaction flask was then connected to a small packed column arranged for distillation under reduced pressure and the metallation reaction was brought to completion by heating the reactants at 90-110° C. and the alcohol from the reaction was simultaneously removed as distillate at the head of the column at 41-43° C. under 150 mm. pressure. The metallated ester was then isolated by removing one-fourth of the diethyl carbonate solution, distilling off the diethyl carbonate under reduced pressure (150 mm.) and allowing the residue to cool and solidify. There remained in the flask a wax-like, gummy solid.

To prove further the identity of this magnesio derivative, the wax-like gummy solid obtained above was treated with cold water and acidified with hydrochloric acid. The liberated oily material was extracted from the aqueous mixture by means of isopropyl ether, and after drying the ether solution, the solvent was removed and the residual oil was distilled. A high recovery of diethyl malonate, boiling at 93-94° C. under 18 mm. pressure was obtained.

To prove further the presence of a high yield of metallated diethyl malonate in the reaction solution, the remaining three-fourths of the diethyl carbonate solution was alkylated with an excess of ethyl iodide. A high yield of ethylated ester was obtained. As is usually the case in the ethylation of malonic ester, the ethylated product consisted of a mixture of diethyl ethylmalonate and diethyl diethylmalonate.

EXAMPLE 10

Diethyl ethylmalonate

Magnesium turnings (6.0 g.), catalyzed with mercuric chloride (1.5 g.), were dissolved in anhydrous ethyl alcohol (200 ml.) by refluxing 24 hours. Diethyl carbonate (300 ml.) and diethyl ethylmalonate (47 g.) were then added and the resulting mixture was stirred until all of the magnesium ethylate had gone into solution. The flask was then connected to a small packed column arranged for distillation under reduced pressure. Completion of the metallation reaction was brought about by heating the reactants in the flask at about 90-100° C. and the alcohol from the reaction of the magnesium ethylate and diethyl ethylmalonate, as well as that left in the magnesium ethylate, was removed as distillate at the head of the column at 41-43° C. under 150 mm. pressure.

To prove the presence of a high yield of metallated diethyl ethylmalonate, one-half of the contents of the flask was alkylated by refluxing 24 hours with an excess of ethyl iodide. The reaction mixture was worked up by adding water, acidifying, extracting with ether, drying the extract, and distilling off the ether and diethyl carbonate. Fractionation of the residue gave a yield of 22.3 g. (82.6%) of diethyl diethylmalonate.

To prove further the presence of a high yield of metallated diethyl ethylmalonate, one-fourth of the original reaction mixture was placed in a flask and all of the diethyl carbonate was removed under reduced pressure (150 mm.). On cooling, there remained in the flask a brown, gummy, wax-like solid. On adding water, acidifying, extracting with ether, drying the extract, and distilling off the ether and fractionating the residual oil, a high yield of unchanged diethyl ethylmalonate was obtained.

Carrying out the above metallation procedures without the simultaneous removal, by distillation, of the alcohol produced in the reaction, is entirely feasible, but the yield is decreased from that otherwise obtainable.

Attention is directed to our copending Patent 2,391,530, which is a continuation-in-part of and was copending with out Patent 2,351,085.

In view of the above, it will be seen that the several objects of the invention are achieved and other advantageous results attained.

As many changes could be made in the above processes without departing from the scope of the invention, it is intended that all matter contained in the above description shall be interpreted as illustrative and not in a limiting sense.

We claim:

1. The method of metallating a malonic ester of the following structure:

$$R \cdot CH(CO_2Y) \cdot CO_2X$$

where R is selected from the group consisting of hydrogen, aromatic hydrocarbon radicals and saturated aliphatic hydrocarbon radicals, and X and Y are alkyl radicals, which comprises reacting the ester with an anhydrous alcoholate of a metal selected from the group consisting of sodium, potassium and magnesium in a reaction medium consisting essentially of a dialkyl carbonate.

2. The method of metallating a malonic ester of the following structure:

$$R \cdot CH(CO_2Y) \cdot CO_2X$$

where R is selected from the group consisting of hydrogen, aromatic hydrocarbon radicals and saturated aliphatic hydrocarbon radicals, and X and Y are alkyl radicals, which comprises reacting the ester with an anhydrous alcoholate of a metal selected from the group consisting of sodium, potassium and magnesium in a reaction medium consisting essentially of a dialkyl carbonate, and removing alcohol.

3. The method of metallating a malonic ester of the following structure:

$$R \cdot CH(CO_2Y) \cdot CO_2X$$

where R is selected from the group consisting of hydrogen, aromatic hydrocarbon radicals and saturated aliphatic hydrocarbon radicals, and X and Y are alkyl radicals, which comprises reacting the ester with an anhydrous alcoholate of a metal selected from the group consisting of sodium, potassium and magnesium in a reaction medium consisting essentially of a dialkyl carbonate, and subjecting the mixture to distillation for removing alcohol therefrom.

4. The method of metallating diethyl ethylmalonate, which comprises reacting the ester with anhydrous sodium ethylate in a reaction medium consisting essentially of diethyl carbonate.

5. The method of metallating diethyl sec.-butylmalonate, which comprises reacting the ester with anhydrous sodium ethylate in a reaction medium consisting essentially of diethyl carbonate.

6. The method of metallating diethyl phenylmalonate, which comprises reacting the ester with anhydrous sodium ethylate in a reaction medium consisting essentially of diethyl carbonate.

VERNON H. WALLINGFORD.
AUGUST H. HOMEYER.

REFERENCES CITED

The following references are of record in the file of this patent:

UNITED STATES PATENTS

| Number | Name | Date |
|---|---|---|
| 789,902 | Engelmann | May 16, 1905 |
| 1,036,624 | Horlein | Aug. 27, 1912 |
| 2,351,085 | Wallingford | June 13, 1944 |
| 2,363,003 | Jones | Nov. 21, 1944 |

OTHER REFERENCES

Conrad et al., "Annalen der Chem." (Liebig), vol. 204 (1880), pp. 121, 129, 130, 131.

Lux, "Ber. der Deut. Chem. Gesell.," vol. 62 (1929), pp. 1824–1827.